United States Patent [19]

Sydansk

[11] Patent Number: 4,770,245
[45] Date of Patent: * Sep. 13, 1988

[54] RATE-CONTROLLED POLYMER GELATION PROCESS FOR OIL RECOVERY APPLICATIONS

[75] Inventor: Robert D. Sydansk, Littleton, Colo.

[73] Assignee: Marathon Oil Company, Findlay, Ohio

[*] Notice: The portion of the term of this patent subsequent to Feb. 2, 2005 has been disclaimed.

[21] Appl. No.: 918,419

[22] Filed: Oct. 14, 1986

[51] Int. Cl.$^4$ ............................................. E21B 33/138
[52] U.S. Cl. ..................................... 166/295; 166/50; 166/294; 166/300; 523/130
[58] Field of Search ................. 166/294, 50, 295, 274, 166/275, 308, 300; 405/264; 523/130, 132

[56] References Cited

U.S. PATENT DOCUMENTS

| | | | |
|---|---|---|---|
| 3,447,608 | 6/1969 | Fry et al. | 166/294 |
| 3,762,476 | 10/1973 | Gall | 166/294 |
| 3,926,258 | 12/1975 | Hessert et al. | 166/294 |
| 3,938,594 | 2/1976 | Rhudy et al. | 166/308 |
| 3,971,440 | 7/1976 | Hessert et al. | 166/294 |
| 3,978,928 | 9/1976 | Clampitt | 166/294 |
| 3,981,363 | 9/1976 | Gall | 166/270 |
| 4,018,286 | 4/1977 | Gall et al. | 166/295 |
| 4,039,029 | 8/1977 | Gall | 166/294 |
| 4,137,182 | 1/1979 | Golinkin | 166/295 |
| 4,552,217 | 11/1985 | Wu et al. | 166/295 |
| 4,606,407 | 8/1986 | Shu | 166/275 |
| 4,644,073 | 2/1987 | Mumallah et al. | 252/8.554 |

*Primary Examiner*—Stephen J. Novosad
*Assistant Examiner*—Bruce M. Kisliuk
*Attorney, Agent, or Firm*—Jack L. Hummel; Rodney F. Brown

[57] ABSTRACT

A process for controlling the gelation rate of a carboxylate-containing polymer used in oil recovery applications. A gel is prepared by mixing a single aqueous gelation solution at the surface made up of the polymer and a crosslinking agent containing a chromic carboxylate complex and an inorganic chromic salt. The concentration of the inorganic chromic salt is selected at a level which achieves the desired rate of gelation for a given application.

38 Claims, 1 Drawing Sheet

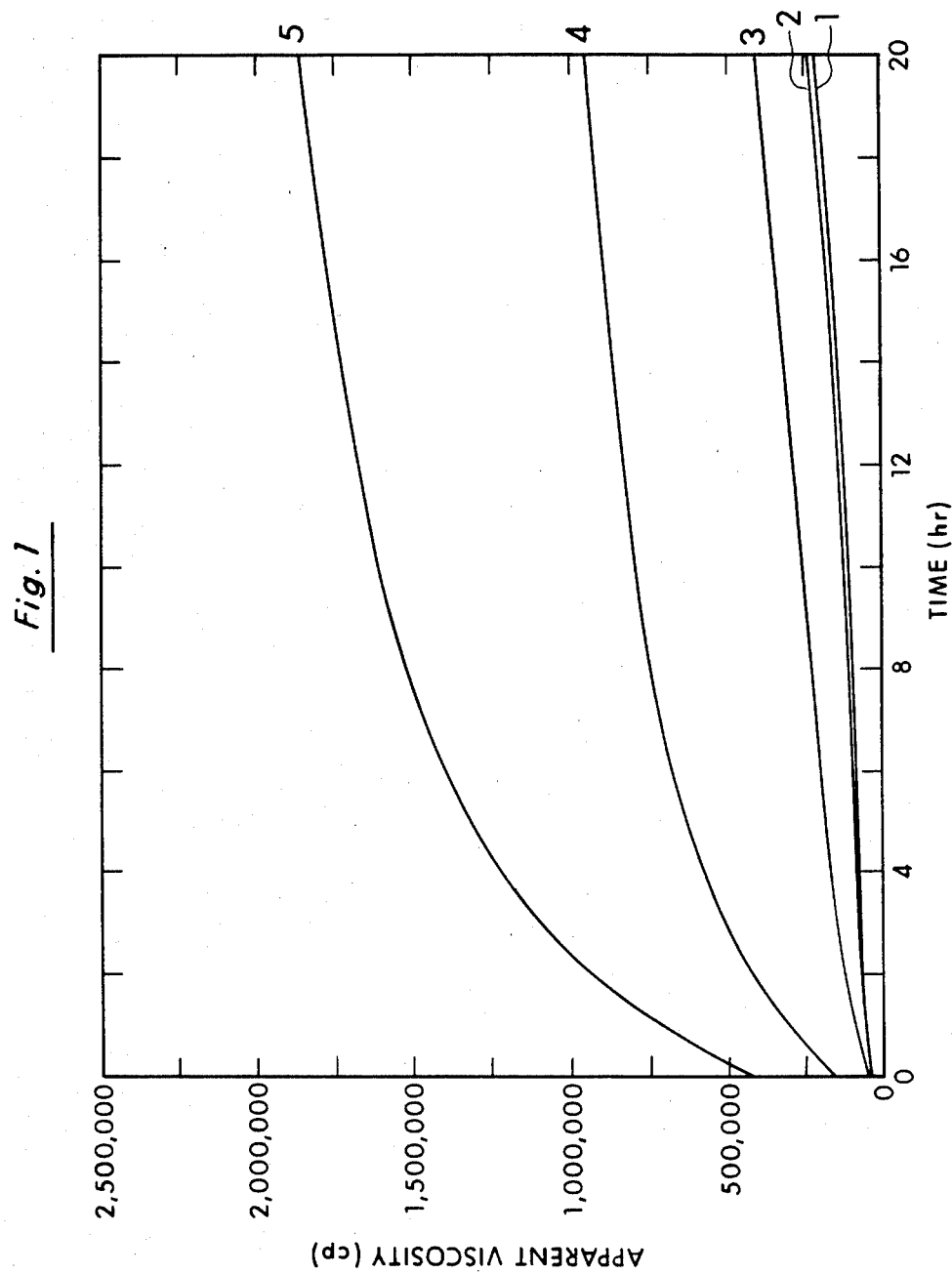

RATE-CONTROLLED POLYMER GELATION PROCESS FOR OIL RECOVERY APPLICATIONS

BACKGROUND OF THE INVENTION

1. Technical Field

The invention relates to an oil recovery process and more particularly to a process of preparing an accelerated polymer gel for oil recovery applications.

2. Description of Related Art

Polymer gels have potential application to a number of oil recovery processes including squeeze-cementing, fracturing and conformance improvement. Poor vertical conformance results from the vertical juxtaposition of relatively high permeability geologic regions to relatively low permeability regions within a subterranean formation. Poor areal conformance results from the presence of high permeability streaks and high permeability anomalies within the formation matrix, such as vertical fractures and networks of the same, which have very high permeability relative to the formation matrix. Fluids generally exhibit poor flow profiles and sweep efficiencies in subterranean formations having poor vertical or areal conformance. Poor conformance is particularly a problem where vertical heterogeneity and/or fracture networks or other structural anomalies are in fluid communication with a subterranean wellbore across which fluids are injected or produced.

A number of attempts to remedy conformance problems exist. U.S. Pat. Nos. 3,762,476; 3,981,363; 4,018,286; and 4,039,029 to Gall or Gall et al describe various processes wherein gel compositions are formed in high permeability regions of subterranean formations to reduce the permeability therein. According to U.S. Pat. No. 3,762,476, a polymer such as polyacrylamide is injected into a formation followed sequentially by a crosslinking agent. The sequentially injected slugs are believed to permeate the treatment region of the formation and gel in situ.

It is generally held that effective polymer/crosslinking agent systems necessitate sequential injection of the gel components followed by in situ mixing because gel systems mixed on the surface are difficult to regulate. Systems mixed on the surface often gel at an excessive rate, forming gel balls before they can effectively penetrate the treatment region. However, in practice, conformance treatments such as that disclosed in U.S. Pat. No. 3,762,476 using sequentially injected gel systems have proven unsatisfactory because of the inability to achieve complete mixing and gelation in the formation. As a result, gels only form at the interface of the unmixed gel components and often in regions remote from the desired treatment region. Likewise, processes employing sequentially injected gel systems for cementing and fracturing applications have proven unsatisfactory because the resulting gels do not have sufficient strength and integrity to withstand the stresses encountered in oil recovery processes.

A need exists for a gelation process wherein the gelation solution gels at a rapid yet orderly and controlled rate. A need exists for a process wherein the gelation solution substantially penetrates the desired treatment region of a subterranean hydrocarbon-bearing formation and sets up without undue delay as an effective uniform gel. A need exists for a gelation process which can produce a range of versatile gels having the desired predetermined strengths and integrities for conformance-improving, cementing, or fracturing applications.

SUMMARY OF THE INVENTION

The present invention provides a process for improving hydrocarbon recovery from a subterranean hydrocarbon-bearing formation penetrated by a production and/or injection well. According to one embodiment, the process improves vertical and areal conformance in the formation and correspondingly improves flow profiles and sweep efficiencies of injected and/or produced fluids in the formation. According to another embodiment, the process provides a strong, permanent material for cementing jobs. According to yet another embodiment, the process provides an effective fluid for formation fracturing. These objectives and others are achieved by a polymer gelation process employing a two-component crosslinking agent.

The process comprises preparing a single aqueous gelation solution at the surface containing a high molecular weight, water-soluble, carboxylate-containing polymer and a crosslinking agent comprising a chromic carboxylate complex and an inorganic chromic salt. The practitioner controls the gelation rate of the solution to achieve one of three gelation scenarios: (1) the solution gels completely at the surface and the resulting gel is injected into a desired subterranean region; (2) the solution partially gels at the surface and the partially-gelled solution is injected into a desired subterranean region where it gels to completion; and (3) the substantially ungelled solution is injected into a desired subterranean region where complete gelation occurs.

The present invention enables the practitioner to control the gelation rate or time required for complete gelation and ultimately the overall gelation scenario by increasing or decreasing the relative amount of inorganic chromic salt in the crosslinking agent. The gelation scenario employed in the process is predetermined according to the desired gel function, i.e., fracturing, cementing or conformance improvement, and the specific demands of the subterranean formation.

The resultant gel is a viscous continuous single-phase composition comprised of the polymer and crosslinking agent. Once the gel is in place for its desired function as a cement or flow diverter or the gel has completed a fracturing treatment, fluids may be injected into or produced from the hydrocarbon-bearing regions of the formation in fluid communication with the wellbore. The gel in place is substantially incapable of flowing from the treatment region and is substantially permanent and resistant to in situ degradation.

The process provides distinct advantages over known gelation processes. The practitioner of the present invention can fully prepare and mix a single gelation solution at the surface to achieve a controlled gelation rate. Gelation rate has been found to be an involved function of many gelation parameters including temperature, pH, gel component concentrations, polymer molecular weight, degree of polymer hydrolysis, etc. Although a practitioner can produce gels over a range of orderly gelation rates and finite periods of time by careful selection of values for the above-stated parameters as disclosed in copending U.S. application Ser. No. 822,709, now U.S. Pat. No. 4,683,949, the present invention enables the practitioner to design a gelation process having a gelation rate and time which are selected from a broad range of rates and times without substantially altering the majority of gelation parameters.

The present process is particularly advantageous because it enables the practitioner to predetermine a specific desired gelation rate by selecting the value of only one relatively independent parameter, inorganic chromic salt concentration in the crosslinking agent. Although the gelation rate can be predetermined by varying other gelation parameters as noted above, simply controlling the inorganic chromic salt concentration may be economically and/or operationally more attractive. It may be undesirable to vary other gelation parameters because they are functionally correlated to final gel properties such as gel strength and stability. If one varies these parameters to achieve a given gelation rate, one could adversely affect the final gel properties.

The present process allows one to set the gelation rate as a function of only one gelation parameter without substantially altering the final gel properties. In addition, the present process provides a broader range of achievable gelation rates. That is, the use of inorganic chromic salt enables more accelerated, yet still controlled, gelation rates than other controlled gelation methods. The resultant gel has sufficient strength and stability to meet the demands of the formation and the specific hydrocarbon recovery process employed.

BRIEF DESCRIPTION OF THE DRAWING

FIG. 1 shows the gelation rate of polymer samples as a function of crosslinking agent composition. The curves plot apparent viscosity versus time for each sample.

DESCRIPTION OF PREFERRED EMBODIMENTS

The present invention is described in the context of specific terms which are defined as follows. The formation consists of two general regions, the "matrix" and "anomalies." An "anomaly" is a volume or void space in the formation having very high permeability relative to the matrix. It is inclusive of terms such as streaks, fractures, fracture networks, vugs, solution channels, caverns, washouts, cavities, etc. The "matrix" is substantially the remainder of the formation volume characterized as essentially homogeneous, continuous, sedimentary reservoir material free of anomalies and often competent.

The matrix consists of horizontal "zones" of distinctive subterranean material of continuous geologic properties which extend in the horizontal direction. "Vertical conformance" is a measure of the degree of geologic uniformity in permeability as one moves vertically across the formation. "Areal conformance" is a measure of the degree of geologic uniformity in permeability as one moves horizontally across the formation. A "flow profile" qualitatively describes the uniformity of fluid flow through a subterranean formation while "sweep efficiency" is the quantitative analog of "flow profile." "Plugging" is a substantial reduction in permeability in a region of a formation.

The term "gel" as used herein is directed to a continuous three-dimensional crosslinked polymeric network having an ultra high molecular weight. The gel is qualitatively defined as "flowing" or "non-flowing" based on its ability to flow under the force of gravity when unconfined on the surface at ambient atmospheric conditions. A flowing gel flows under these conditions; a non-flowing gel does not. Nonetheless, both a non-flowing gel and a flowing gel are defined herein as having sufficient structure so as not to propagate from the confines of the desired treatment region when injected therein.

Partially gelled solutions are also referred to herein. A partially gelled solution is at least somewhat more viscous than an uncrosslinked polymer solution such that it is incapable of entering a less permeable region where no treatment is desired, but sufficiently fluid such that it is capable of displacement into a desired treatment zone. The crosslinking agent of the partially gelled solution has reacted incompletely with the polymer, but is capable of continued reaction to completion thereafter, resulting in the desired gel.

The gel composition utilized in the present invention is comprised of substantially any carboxylate-containing polymer and a crosslinking agent. The polymer is preferably a synthetic acrylamide polymer such as polyacrylamide or partially hydrolyzed polyacrylamide although other carboxylate-containing synthetic polymers and biopolymers are useful. The acrylamide polymer may be prepared according to any conventional method known in the art, but preferably has the specific properties of acrylamide polymer prepared according to the method disclosed by U.S. Pat. No. 4,433,727 to Argabright et al incorporated herein by reference. The average molecular weight of the acrylamide polymer is in the range of about 10,000 to about 50,000,000 and preferably about 100,000 to about 20,000,000, and most preferably about 200,000 to about 12,000,000. The polymer concentration in the solution is about 1000 ppm up to the solubility limit of the polymer in the solvent or the rheological constraints of the polymer solution.

The crosslinking agent is an inorganic chromic salt and a chromic carboxylate complex or mixture of chromic carboxylate complexes. The term "complex" is defined herein as an ion or molecule containing two or more interassociated ionic, radical or molecular species. A complex ion as a whole has a distinct electrical charge while a complex molecule is electrically neutral.

The complex of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical chrarge of the complex, or one or more water molecules may be associated with each complex. Representative formulae of such complexes include:

$[Cr_3(CH_3CO_2)_6(OH)_2]^{+1}$;

$[Cr_3(OH)_2(CH_3CO_2)_6]NO_3 \cdot 6H_2O$;

$[Cr_3(H_2O)_2(CH_3CO_2)_6]^{+3}$;

$[Cr_3(H_2O)_2(CH_3CO_2)_6](CH_3CO_2)_3 \cdot H_2O$; etc.

Trivalent chromium and chromic ion are equivalent terms encompassed by the term chromium III species as used herein. The carboxylate species are advantageously derived from water-soluble salts of carboxylic acids, especially low molecular weight mono-basic acids. Carboxylate species derived from salts of formic, acetic, propionic, and lactic acid, lower substituted derivatives thereof and mixtures thereof are especially preferred. The carboxylate species include the following water-soluble species: formate, acetate, propionate, lactate, lower substituted derivatives thereof, and mixtures thereof. The optional inorganic ions include sodium, sulfate, nitrate and chloride ions.

A host of complexes of the type described above and their method of preparation are well known in the leather tanning art. These complexes are described in Shuttleworth and Russel, *Journal of The Society of Leather Trades' Chemists*, "The Kinetics of Chrome Tannage Part I.," United Kingdom, 1965, v. 49, p. 133-154; "Part III.," United Kingdom, 1965, v. 49, p. 251-260; "Part IV.," United Kingdom, 1965, v. 49, p. 261-268; and Von Erdman, *Das Leder*, "Condensation of Mononuclear Chromium (III) Salts to Polynuclear Compounds," Eduard Roether Verlag, Darmstadt, Germany, 1963, v. 14, p. 249; and are incorporated herein by reference. Udy, Marvin J., *Chromium, Volume 1: Chemistry of Chromium and Its Compounds*, Reinhold Publishing Corp., N.Y., 1956, pp. 229-233; and Cotton and Wilkinson, *Advanced Inorganic Chemistry 3rd Ed.*, John Wiley & Sons, Inc., N.Y., 1972, pp. 836-839, further describe typical complexes which may be within the scope of the present invention and are incorporated herein by reference. The present invention is not limited to the specific complexes and mixtures thereof described in the references, but may include others satisfying the above-stated definition.

The inorganic chromic salts of the present invention are compounds consisting of elecropositive chromium III cations and electonegative monovalent inorganic anions. Exemplary inorganic salts of chromium III in the present invention include chromic trichloride, chromic trinitrate, chromic triiodide, chromic tribromide and chromic triperchlorate.

The gel is formed by admixing a carboxylate-containing polymer and crosslinking agent at the surface to form a single injectable gelation solution. Surface admixing broadly encompasses inter alia mixing the solution in bulk at the surface prior to injection or simultaneously mixing the solution at or near the wellhead by in-line mixing means while injecting it. Admixing is accomplished for example by dissolving the starting materials for the crosslinking agent in an appropriate aqueous solvent. The crosslinking agent solution is then mixed with an aqueous polymer solution to produce the gelation solution. Among other alternatives, the starting materials for the crosslinking agent can be dissolved directly in the aqueous polymer solution to form the gelation solution in a single step. The weight ratio of carboxylate-containing polymer to crosslinking agent is about 1:1 to 500:1, preferably about 2.5:1 to 200:1, and most preferably about 5:1 to 50:1.

The aqueous solvent of the gelation solution may be fresh water or a brine having a total dissolved solids concentration up to the solubility limit of the solids in water. Inert fillers such as crushed or naturally fine rock material or glass beads can also be added to the gelation solution to reinforce the gel network structure.

The present process enables the practitioner to produce a gel at a predetermined gelation rate as a function of the crosslinking agent composition. The gelation rate is defined as the degree of gel formation as a function of time or, synonymously, the rate of crosslinking in the gelation solution. The degree of crosslinking may be quantified in terms of gel viscosity and/or strength. The practitioner generally selects a ratio of the complex to the inorganic salt in the gelation solution by weight within the range of about 1:1 to about 500:1 and most preferably about 3:1 to about 50:1 to achieve a predetermined gelation rate or time. Gelation is preferably substantially complete within a time range of nearly instantaneous up to about 48 hours or more.

The predetermined gelation rate advantageously enables preparation of the gelation solution at the surface, injection of the solution as a single uniform slug into the wellbore, and displacement of the entire solution into the desired subterranean zone within a relatively short period of time so that the well may be activated for injection or production thereafter. The process can be designed to gel the solution completely at the surface, partially gel the solution at the surface and complete the gelation reaction in situ, or conduct the gelation reaction in situ.

The present gelation mechanism enables the practitioner to design a gelation solution which can be injected into a formation at a desired injection rate with little resistance to injectivity. Where gelation is in situ, the solution is preferably gelled rapidly after it is in place in the desired subterranean region to minimize lost production from shut in or injection and/or production wells.

According to one embodiment, the process is applicable to conformance treatment of formations under most conditions and is specific to treating regions within the formation which are in fluid communication with an injection or production well. The flowing gel is especially applicable to the treatment of anomalies such as streaks of relatively high permeability, fractures or fracture networks in direct communication via the anomaly with an injection well but not also in direct communication via the anomaly with a production well. The ultimate gel is termed a flowing gel as defined herein because it would flow if unconfined on the surface. However, the flowing gel is sufficiently cross-linked to remain in place under injection conditions in the anomaly when confined thereby. Thus, the flowing gel is capable of effectively plugging the anomaly.

The flowing gel is not generally suitable for treatment of anomalies in direct communication via the anomaly with production wells because flowing gels do not have sufficient strength to withstand the drawdown pressure during production and may flow back into the wellbore. For treatment of anomalies in direct communication with production wells, non-flowing rigid gels having sufficient strength to withstand the production drawdown pressure are preferred. It is preferred that substantially none of the gel flows back into the wellbore when oil is produced after the conformance treatment.

In some specialized cases, the solution can be injected into a selected high permeability zone of the matrix and crosslinked to completion in situ as either a non-flowing gel or a flowing gel. Both flowing and non-flowing gels can be used for treatment of high permeability zones of the matrix because in general neither will flow from the treatment zone upon complete gelation, a necessary condition for the present invention. However, non-flowing gels are often preferred for treatment of high permeability zones in direct communication with production wells because of their increased strength.

Conformance treatment of regions in direct communication with a production well by the process of the present invention can effectively improve the hydrocarbon productivity of the well and/or decrease the water to hydrocarbon ratio of the produced fluids.

According to other embodiments, the present process is applicable to cementing and fracturing operations. The gelation solution is preprared in the manner described above and applied according to conventional cementing or fracturing methods known in the art. The non-flowing rigid gel produced according to the present invention is the preferred cement composition for cementing jobs. The composition is particularly applicable to remedial squeeze-cementing jobs which can also effectively improve the hydrocarbon productivity of a production well and/or decrease the water to hydrocarbon ratio of the produced fluids. The flowing gel produced according to the present invention is the preferred fracturing fluid.

The following examples demonstrate the practice and utility of the present invention but are not to be construed as limiting the scope thereof.

Examples 1-3 are formatted as tables of data which describe the formulation and maturation of one or more gels. Each gel is represented in a table by a single experimental run. Data include the conditions for producing the gel and the quantitative or qualitative strength of the produced gel. The tables display data in a two-tier format. The first tier is values of the gelation conditions which vary among the different runs in the table but are constant for any given run. The second tier is the gel strength which varies as a function of gelation time (expressed in hours) within each run. Qualitative gel strength is expressed in alphabetic code.

The following gel strength code is useful for interpreting the tables.

Gel Strength Code A
No detectable continuous gel formed: the bulk of the gel appears to have the same viscosity as the original polymer solution although in some cases isolated highly viscous gel balls may be present. B
Highly flowing gel: the gel appears to be only slightly more viscous than the initial polymer solution. C
Flowing gel: most of the gel flows to the bottle cap by gravity upon inversion. D
Moderately flowing gel: only a small portion (5-10%) of the gel does not readily flow to the bottle cap by gravity upon inversion (usually characterized as a tonguing gel). E
Barely flowing gel: the gel can barely flow to the bottle cap and/or a significant portion (>15%) of the gel does not flow by gravity upon inversion. F
Highly deformable nonflowing gel: the gel does not flow to the bottle cap by gravity upon inversion. G
Moderately deformable nonflowing gel: the gel deforms about half way down the bottle by gravity upon inversion. H
Slightly deformable nonflowing gel: only the gel surface slightly deforms by gravity upon inversion. I
Rigid gel: there is no gel surface deformation by gravity upon inversion. J
Ringing rigid gel: a tuning fork-like mechanical vibration can be felt upon tapping the bottle.

All the polymer solutions of the following examples are prepared by diluting aqueous acrylamide polymer solutions with an aqueous solvent. The qualitative data are obtained by combining the dilute polymer solution with a crosslinking agent solution in a 0.06 liter widemouth bottle to form a 0.02 liter sample. The sample is gelled in the capped bottle and the qualitative gel strength is determined by periodically inverting the bottle.

Samples of gelation solutions in Examples 1-3 are prepared by combining 20 ml of a 2% by weight polyacrylamide solution in Denver, Color. tap water with 0.19 ml of a 10% crosslinking agent solution. (The polyacrylamide is 2.0% hydrolyzed and has a molecular weight of 11,000,000. The polymer solution has a pH of 8.6.) The resulting gelation solution has a polymer concentration of 19,800 ppm, a crosslinking agent concentration of 990 ppm, and a weight ratio of polymer to crosslinking agent of 20:1. The sample is gelled at room temperature under a nitrogen blanket and the qualitative gel strength is determined by periodically inverting the sample.

The crosslinking agent solution is that of the present invention (i.e., an inorganic chromic salt and a chromic acetate complex or mixture of complexes). The crosslinking agent solution is prepared by dissolving solid $CrAc_3 \cdot H_2O$ and the specified inorganic chromic salt in water. The specific composition of the crosslinking agent solution for each run is described at the top of the tables in Examples 1-3.

EXAMPLE 1

| | Inorganic Salt: $Cr(ClO_4)_3$ | | | | | | |
|---|---|---|---|---|---|---|---|
| Run Number | 1 | 2 | 3 | 4 | 5 | 6 | 7 |
| wt % CrAc complex | 10.0 | 9.5 | 9.0 | 8.5 | 8.0 | 7.0 | 6.0 |
| wt % inorganic salt | 0 | 1.5 | 1.0 | 1.5 | 2.0 | 3.0 | 4.0 |
| Time (hr) | | | | Gel Code | | | |
| 0.5 | A | A | A | A | A | C | F |
| 1.0 | A | A | A | A | A | F | G |
| 2.0 | B | B | B | B | B | G | H |
| 3.0 | C | B | B | B | B | G | H |
| 4.0 | C | B | B | B | D | H | H |
| 5.0 | C | C | B | B | F | H | H |
| 6.0 | D | D | D | D | F | H | I |
| 7.0 | F | F | F | F | H | H | I |
| 24 | H | H | H | H | H | H | I |
| 48 | I | I | I | I | I | I | I |
| 72 | I | I | I | I | I | I | I |
| 96 | I | I | I | I | I | I | I |
| 168 | J | J | J | J | J | J | J |
| 300 | J | J | J | J | J | J | J |

EXAMPLE 2

| | Inorganic Salt: $CrBr_3$ | | | | | |
|---|---|---|---|---|---|---|
| Run Number | 1 | 2 | 3 | 4 | 5 | 6 |
| wt % CrAc complex | 10.0 | 9.5 | 9.0 | 8.5 | 8.0 | 7.0 |
| wt % inorganic salt | 0 | 1.5 | 1.0 | 1.5 | 2.0 | 3.0 |
| Time (hr) | | | Gel Code | | | |
| 0.5 | A | A | A | A | A | F |
| 1.0 | A | A | A | A | E | G |
| 2.0 | B | A | A | A | F | H |
| 3.0 | C | B | B | B | G | H |
| 4.0 | C | C | C | C | G | H |
| 5.0 | C | C | C | F | G | H |
| 6.0 | D | D | D | G | H | I |
| 7.0 | F | F | F | H | H | I |
| 24 | H | H | H | I | I | I |
| 48 | I | I | I | I | I | I |
| 72 | I | I | I | I | I | I |
| 96 | I | I | I | I | I | I |
| 168 | J | J | J | J | J | J |
| 300 | J | J | J | J | J | J |

EXAMPLE 3

| | Inorganic Salt: CrI₃ | | | | | |
|---|---|---|---|---|---|---|
| Run Number | 1 | 2 | 3 | 4 | 5 | 6 |
| wt % CrAc complex | 10.0 | 9.5 | 9.0 | 8.5 | 8.0 | 7.0 |
| wt % inorganic salt | 0 | 1.5 | 1.0 | 1.5 | 2.0 | 3.0 |
| Time (hr) | | | Gel Code | | | |
| 0.5 | A | A | A | A | A | A |
| 1.0 | A | A | A | A | B | B |
| 2.0 | B | A | A | A | D | F |
| 3.0 | C | B | B | B | F | G |
| 4.0 | C | C | C | C | G | G |
| 5.0 | C | C | C | C | G | G |
| 6.0 | D | D | D | D | H | H |
| 7.0 | F | E | F | G | H | H |
| 24 | H | H | H | H | I | I |
| 48 | I | I | I | I | I | I |
| 72 | I | I | I | I | I | I |
| 96 | I | I | I | I | I | I |
| 168 | J | J | J | J | J | J |
| 300 | J | J | J | J | J | J |

Examples 1–3 indicate generally that the gelation rate is accelerated considerably by increasing the relative concentration of inorganic chromic salt in the gelation solution.

EXAMPLE 4

A polymer solution having a concentration of 8350 ppm is prepared by dissolving a 30% hydrolyzed polyacrylamide having a molecular weight of about 5,000,000 in an aqueous 5000 ppm NaCl solution. A solution of chromic chloride containing no chromic carboxylate complex is added to the polymer solution at room temperature such that the resulting gelation solution has the relative composition specified below. The gelation results are shown below.

| Run Number | 1 | 2 |
|---|---|---|
| wt ratio of PHPA:crosslinking agent | 30.1 | 20.6 |
| Time | Gel Code | |
| 1.0 | A | A |
| 2.0 | A | A |
| 3.0 | A | A |
| 4.0 | A | A |
| 6.0 | A | A |
| 9.0 | A | A |
| 24 | A | A |
| 48 | A | A |
| 96 | A | A |
| 336 | A | A |
| 672 | A | A |

Crosslinking of the samples occurs so rapidly that local gel balls form around the crosslinking agent solutions as they are added to the polymer solution. Uncontrolled gelation of the gel components on contact prevents effective mixing thereof. As a result, the above-described compositions are unable to form continuous gels. Controlled accelerated gelation is only achieved when both components of the crosslinking agent of the present invention are present, the inorganic chromic salt and the chromic carboxylate complex. If only the inorganic chromic salt is present, crosslinking is too rapid and uncontrollable. If only the chromic carboxylate complex is present, crosslinking may be too slow.

EXAMPLE 5

Five separate gelation solutions are prepared by mixing a 2% by weight polyacrylamide solution in tap water with a different crosslinking agent solution. Each of the five crosslinking agent solutions is characterized below. In all cases, the ratio of polyacrylamide to crosslinking agent is 20:1 by weight. The crosslinking agent solutions are prepared by dissolving solid CrAc₃·H₂O and CrCl₃, if an inorganic salt is specified, in Denver, Color. tap water.

| Run Number | Composition |
|---|---|
| 1 | 10% CrAc complex |
| 2 | 9.5% CrAc complex |
| | 0.5% inorganic salt |
| 3 | 9.0% CrAc complex |
| | 1.0% inorganic salt |
| 4 | 8.5% CrAc complex |
| | 1.5% inorganic salt |
| 5 | 8.0% CrAc complex |
| | 2.0% inorganic salt |

The relative gelation rate of each sample is shown in FIG. 1. The apparent viscosity is determined under conditions of 0.1 rad/sec and 100% strain. The curves are labeled according to the run number. The data support the conclusion of Examples 1–3, i.e., the gelation rate accelerates as the relative concentration of inorganic chromic salt in the gelation solution increases.

While foregoing preferred embodiments of the invention have been described and shown, it is understood that all alternatives and modifications, such as those suggested and others, may be made thereto and fall within the scope of the invention.

I claim:

1. A process for substantially reducing the permeability of at least one relatively high permeability region bounded by a relatively lower permeability region in a hydrocarbon-bearing formation below an earthen surface penetrated by a wellbore in fluid communication with said at least one relatively high permeability region, the process consisting essentially of:
   (a) premixing a water-soluble carboxylate-containing polymer, an aqueous solvent, a chromic carboxylate complex and an inorganic chromic salt at the surface to form a gelation solution, wherein the concentration of said salt in said solution is sufficient to accelerate the gelation rate of said solution relative to the gelation rate of a salt-free gelation solution;
   (b) injecting said gelation solution into said wellbore; and
   (c) displacing said gelation solution into said at least one relatively high permeability region to form a gel which substantially reduces the permeability of said at least one relatively high permeability region.

2. The process of claim 1 wherein the carboxylate species of said chromic carboxylate complex is selected from the group consisting of formate, acetate, propionate, lactate, lower substituted derivatives thereof, and mixtures thereof.

3. The process of claim 1 wherein said chromic carboxylate complex contains the chromic and the carboxylate species and a species selected from the group consisting of oxygen, hydroxide and mixtures thereof.

4. The process of claim 1 wherein said carboxylate-containing polymer is an acrylamide polymer.

5. The process of claim 1 wherein said wellbore is utilized as a hydrocarbon production wellbore after the completion of steps a, b, and c.

6. The process of claim 5 wherein fluids produced from said hydrocarbon production wellbore have a substantially reduced water to hydrocarbon ratio after performance of steps a, b, and c than before said steps are performed.

7. The process of claim 5 wherein hydrocarbon productivity from said wellbore is substantially increased after performance of steps a, b, and c than before said steps are performed.

8. The process of claim 1 wherein said wellbore is utilized as a fluid injection wellbore after the completion of steps a, b, and c.

9. The process of claim 1 wherein said relatively high permeability region is a fracture or a fracture network.

10. The process of claim 1 wherein said high permeability region is a matrix region of said formation.

11. The process of claim 1 wherein the weight ratio of said polymer to said complex and salt is about 1:1 to about 500:1 and the weight ratio of said chromic carboxylate complex to said inorganic chromic salt is about 50:1 to about 3:1.

12. The process of claim 1 wherein said inorganic chromic salt is selected from the group consisting of chromic trichloride, chromic trinitrate, chromic triiodide, chromic tribromide, chromic triperchlorate, and mixtures thereof.

13. A process for controlling the gelation rate of a polymer gel utilized for a hydrocarbon recovery application in a treatment region of a hydrocarbon-bearing formation below an earthen surface penetrated by a wellbore in communication with said region, the process consisting essentially of:
  (a) predetermining the gelation rate required of said polymer gel to meet the demands of the treatment region;
  (b) premixing a water-soluble carboxylate-containing polymer, an aqueous solvent, a chromic carboxylate complex and an inorganic chromic salt at the surface to form a gelation solution;
  (c) adjusting the concentration of said inorganic chromic salt relative to the concentration of said polymer and complex in said gelation solution to achieve the required predetermined gelation rate;
  (d) injecting said gelation solution into said treatment region via said wellbore; and
  (e) forming said polymer gel from said gelation solution having the required predetermined gelation rate to perform said hydrocarbon recovery application.

14. The process of claim 13 wherein said hydrocarbon recovery application comprises substantially plugging said treatment region.

15. The process of claim 14 wherein said treatment region is an anomaly in said hydrocarbon-bearing formation.

16. The process of claim 15 wherein said anomaly is a fracture or a fracture network.

17. The process of claim 14 wherein said treatment region is a matrix in said hydrocarbon-bearing formation.

18. The process of claim 13 wherein said hydrocarbon recovery application is wellbore cementing and said polymer gel is a cement.

19. The process of claim 18 wherein said treatment region is an annulus between a casing in said wellbore and a wellbore face.

20. The process of claim 18 wherein said wellbore-cementing process is a squeeze-cementing process.

21. The process of claim 20 wherein said treatment region is a void in a primary cement job.

22. The process of claim 13 wherein the carboxylate species of said chromic carboxylate complex is selected from the group consisting of formate, acetate, propionate, lactate, lower substituted derivatives thereof, and mixtures thereof.

23. The process of claim 13 wherein said chromic carboxylate complex contains the chromic and the carboxylate species and a species selected from the group consisting of oxygen, hydroxide and mixtures thereof.

24. The process of claim 13 wherein said carboxylate-containing polymer is an acrylamide polymer.

25. The process of claim 13 wherein said hydrocarbon recovery application is formation fracturing and said polymer gel is a fracturing fluid.

26. A wellbore-cementing process applied to a wellbore in fluid communication with a subterranean hydrocarbon-bearing formation below an earthen surface, consisting essentially of:
  (a) premixing a water-soluble carboxylate-containing polymer, an aqueous solvent, a chromic carboxylate complex and an inorganic chromic salt at the surface to form a gelation solution;
  (b) injecting said gelation solution into a volume in or adjacent said wellbore desired to be plugged via said wellbore; and
  (c) setting up and curing said gelation solution in said volume to form a cement gel which substantially plugs said volume.

27. The process of claim 26 wherein said wellbore-cementing process is a squeeze-cementing process.

28. The process of claim 27 wherein said volume is a void in a primary cement job.

29. The process of claim 27 wherein said wellbore is utilized as a hydrocarbon production wellbore after the completion of steps a, b, and c and said cement gel substantially reduces the water to hydrocarbon ratio of fluids produced from said wellbore after the performance of steps a, b, and c than before said steps are performed.

30. The process of claim 27 wherein said wellbore is utilized as a hydrocarbon production wellbore after the completion of steps a, b, and c and said cement gel substantially increases hydrocarbon productivity from said wellbore after performance of steps a, b, and c than before said steps are performed.

31. The process of claim 26 wherein said wellbore is utilized as a fluid injection wellbore after the completion of steps a, b, and c.

32. The process of claim 26 wherein said carboxylate-containing polymer is an acrylamide polymer.

33. A process for fracturing a matrix of a subterranean hydrocarbon-bearing formation below an earthen surface penetrated by a wellbore in fluid communication with said matrix, consisting essentially of:
  (a) premixing a water-soluble carboxylate-containing polymer, an aqueous solvent, a chromic carboxylate complex and an inorganic chromic salt at the surface to form a fracturing fluid;
  (b) injecting said fracturing fluid into said wellbore; and
  (c) displacing said fracturing fluid into said formation at a pressure above a fracturing pressure of said formation which substantially fractures said matrix of said formation.

34. The process of claim 33 wherein said carboxylate-containing polymer is an acrylamide polymer.

35. The process of claim 1 wherein the carboxylate species of said chromic carboxylate complex is acetate.

36. The process of claim 13 wherein the chromic carboxylate species of said chromic carboxylate complex is acetate.

37. The process of claim 26 wherein the carboxylate species of said chromic carboxylate complex is acetate.

38. The process of claim 33 wherein the carboxylate species of said chromic carboxylate complex is acetate.

* * * * *